(12) United States Patent
Tokumoto et al.

(10) Patent No.: US 7,040,682 B2
(45) Date of Patent: May 9, 2006

(54) INSTALLATION STRUCTURE FOR A SIDE SILL GARNISH

(75) Inventors: Daisuke Tokumoto, Utsunomiya (JP); Kenji Fujita, Moka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/979,660

(22) Filed: Oct. 8, 2004

(65) Prior Publication Data

US 2005/0093343 A1   May 5, 2005

(30) Foreign Application Priority Data

Oct. 15, 2003 (JP) ............................. 2003-355341

(51) Int. Cl.
*B60R 13/02* (2006.01)
(52) U.S. Cl. .................... 296/1.08; 296/209; 52/716.5
(58) Field of Classification Search ............... 296/1.08, 296/209; 52/716.5
See application file for complete search history.

(56) References Cited

U.S. PATENT DOCUMENTS

| | | | |
|---|---|---|---|
| 4,911,495 A | | 3/1990 | Haga et al. .................. 296/209 |
| 6,139,089 A | * | 10/2000 | Troyer ....................... 296/180.1 |
| 6,540,275 B1 | * | 4/2003 | Iwamoto et al. ............... 293/24 |
| 6,685,255 B1 | * | 2/2004 | Kasahara .................. 296/180.1 |

* cited by examiner

*Primary Examiner*—Dennis H. Pedder
(74) *Attorney, Agent, or Firm*—Hamre, Schumann, Mueller & Larson, P.C.

(57) ABSTRACT

A side sill garnish comprises a side covering part that covers the side part of a side sill outside the vehicle in the transverse direction; a side installation part that is installed on the side part of the side sill; a bottom covering part that extends from the bottom edge of the side covering part toward the internal direction of the vehicle along the transverse direction and covers the bottom of the side sill; a bottom installation part that is installed on the bottom of the side sill; and wherein the bottom installation part extends from the side covering part toward the bottom of the side sill separately from the bottom covering part.

2 Claims, 3 Drawing Sheets

INSTALLATION STRUCTURE FOR A SIDE SILL GARNISH

BACKGROUND OF THE INVENTION

1. Field of the Invention

The present invention relates to an installation structure for an automobile side sill garnish.

Priority is claimed on Japanese Patent Application No. 2003-355341, filed Oct. 15, 2003, the content of which is incorporated herein by reference.

2. Description of Related Art

A side sill garnish that covers the side sill is mounted on the side sill of an automobile. As an example of a structure in which such a side sill garnish is installed on a side sill, the side part and the bottom part of a side sill are respectively covered with the side covering part of a side sill garnish and the bottom covering part that extends from the bottom end of the side covering part to the internal direction of the vehicle along the transverse direction, a side installation part that is provided on the side covering part of the side sill garnish is attached to the side part of the side sill by using a clip, and at the same time, the bottom covering part is installed on the bottom part of the side sill by using a clip (refer, for example, to Japanese Unexamined Utility Model, No. H06-21830).

However, in a structure such as the one described above, the side sill garnish and the side sill are comparatively rigidly fastened by the bottom installation part, and thus, for example, when a force is applied from below to the side sill garnish due to the vehicle driving over a step or the like, there is the problem that the bottom covering part of the side sill garnish may be damaged.

Therefore, it is an object of the present invention to provide an installation structure for a side sill garnish that makes damage to the side sill garnish difficult even in the case that a force is applied from below.

SUMMARY OF THE INVENTION

The present invention is an installation structure for a side sill garnish installed on a side sill, wherein the side sill garnish consists of a side covering part that covers the side part of the side sill outside of the vehicle in the transverse direction; a side installation part that is installed on the side of the side sill; a bottom covering part that covers the bottom part of the side sill by extending from the bottom part of the side covering part towards the internal direction of the vehicle along the transverse direction; and a bottom installation part installed on the bottom part of the side sill, and wherein the bottom installation part extends from the side covering part towards the bottom part of the side sill separately from the bottom covering part.

According to this structure, on the side installation part, the side sill garnish is installed on the side part of the side sill on the outside of the vehicle in the transverse direction, and on the bottom installation part, the side sill garnish is installed on the bottom part of the side sill. Among these the bottom installation part extends from the side covering part towards the bottom part of the side sill separately from the bottom covering part, and thus in the case that a force is applied from below to the bottom covering part, this force is absorbed due to the bottom covering part alone deforming independently of the bottom installation part. Therefore, even in the case that a force is applied from below, damage to the side sill garnish as a whole occurs with difficulty.

The bottom installation part can be disposed higher than the bottom covering part.

According to this structure, because the bottom installation part is disposed higher than the bottom covering part, even in the case that a force is applied from below to the bottom covering part, which is below the bottom installation part, damage occurs to the side sill garnish with difficulty.

The bottom installation part can be formed and installed separately from the side covering part.

According to this structure, because the bottom installation part is formed separately and installed on the side covering part, even in the case that the force applied from below is large and damage occurs to the bottom installation part, only the bottom installation part needs to be replaced. Therefore, even if damage unfortunately occurs, the replacement cost can be kept low.

DETAILED DESCRIPTION OF THE INVENTION

Below, the installation structure for the side sill garnish in an embodiment of the present invention will be explained with reference to the figures.

Figure 1:
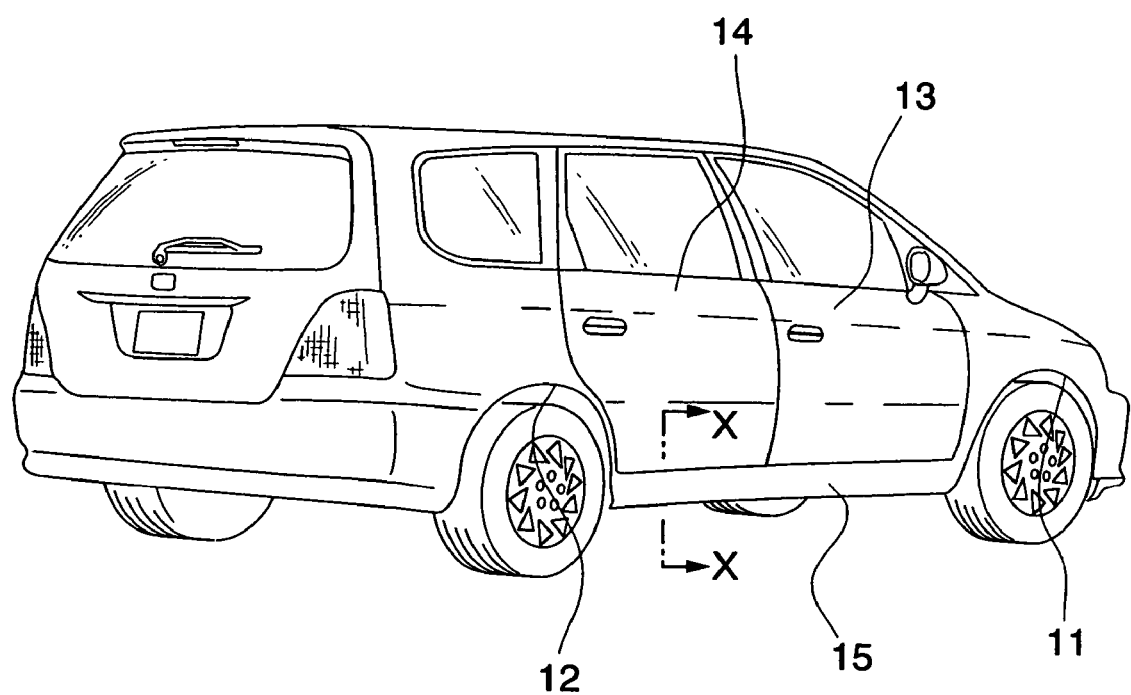
FIG. 1 is a perspective drawing showing the vehicle viewed from the back at an angle in which the installation structure for a side sill garnish in an embodiment of the present invention has been used.
Figure 2:
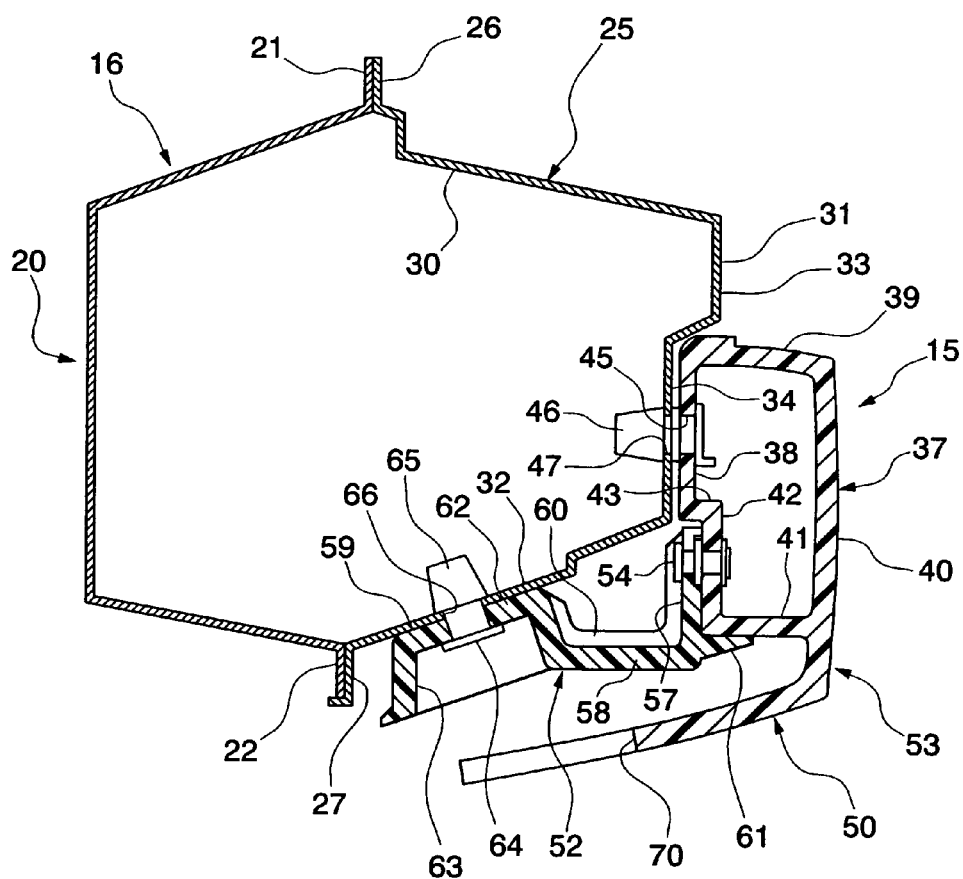
FIG. 2 is a cross-sectional drawing along the line X—X shown in FIG. 1.

FIG. 1 is a perspective drawing showing a vehicle viewed from the back at an angle, wherein the installation structure for a side sill garnish in an embodiment of the present invention has been used. As shown in this figure, the side sill garnish 15 is installed on the bottom part of the vehicle between the front and rear wheel houses 11 and 12, and below the front and rear doors 13 and 14. The side sill garnish 15 is installed in two or more locations in the longitudinal direction of the vehicle on the side sills 16 shown in FIG. 2, which are the vehicle frame members disposed on the inside of the vehicle in the transverse direction. The installation structure for the side sill garnish of the present embodiment is used at installation locations furthest at the back in the longitudinal direction of the vehicle body.

The side sill 16 has a closed cross-sectional shape formed by a side sill inner part 20 and a side sill outer part 25 by joining a flange part 21 on the top edge and a flange part 22 on the bottom edge of the side sill inner part 20, which is provided on the inside of the vehicle in the transverse direction and along the longitudinal direction of the vehicle body, and a flange part 26 on the top edge and a flange part 27 on the bottom edge of the side sill outer part 25, which is provided on the outside of the vehicle in the transverse direction and along the longitudinal direction of the vehicle body.

The side sill outer part 25 consists of an upper plate 30 that extends as a whole from the bottom of the flange part 26 in which the upper edge of the side sill outer part 25 toward the outside of the vehicle along the transverse direction; a side plate (side part) 31 that extends downward as a whole from the outside of the vehicle in the transverse direction; and a lower plate 32 that extends from the bottom of the side plate 31 toward the inside of the vehicle along the transverse direction and connects to the flange part 27 which is the lower edge of the side sill outer part 25. The side plate 31 on the outside of the vehicle in the transverse direction has a shoulder shape formed by a convexity 33 and a concavity 34. The convexity 33 is formed on the upper side of the side plate 31 and projects toward the outside of the vehicle in the transverse direction. The concavity 34 is formed on the lower side of the side plate 31 and is depressed toward the inside of the vehicle in the transverse direction.

A side sill garnish 15 is installed so as to cover the bottom part from the concavity 34 of the side plate 31 of the side sill outer part 25.

Figure 3:
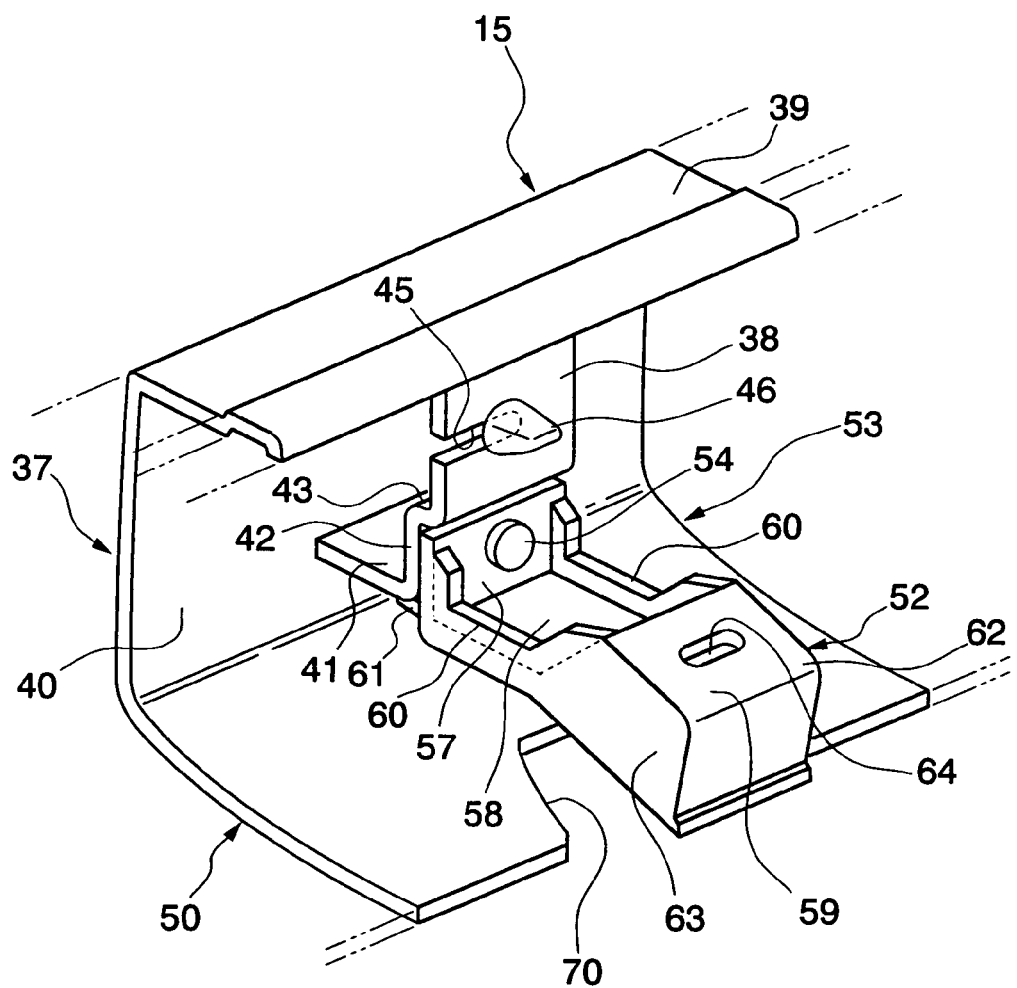
FIG. 3 is a partial perspective drawing showing the structure of the side sill garnish side in the installation structure for the side sill garnish in an embodiment of the present invention.

The side sill garnish 15 has a side covering part 37 that covers this concavity 34 in the state of being mounted on the concavity 34 of the side plate 31 of the side sill 16 outside the vehicle in the transverse direction. The side covering part 37 consists of an installation plate (side installation part) 38 that is installed in the concavity 34; an upper plate 39 that extends as a whole from the top edge of this installation part 38 toward the external direction of the vehicle along the transverse direction; and an outside plate 40 that extends downward as a whole from the edge of this upper plate 39 on the outside of the vehicle in the transverse direction. Here, as shown in FIG. 3, the installation plate 38 is formed only at installation locations for the side sill 16 of the side covering part 37 (side sill garnish 15). In contrast, the upper plate 39 and the outside plate 40 are formed along the entire length of the side sill garnish 15.

At the position of the formation of the installation plate 38, the side covering part 37 consists of a bottom plate part 41 that extends as a whole from the inside of the bottom side intermediate part of the outside plate part 40 toward the internal direction of the vehicle along the transverse direction; an inside plate part 42 that extends upward from the inside edge of the bottom plate part 41 in the transverse direction of the vehicle; and a step plate part 43 that extends from the upper edge of the inside plate part 42 slightly toward the inside of the vehicle in the transverse direction and connects to the bottom edge of the installation plate part 38. The height of the step plate part 43 is substantially aligned with the position of the border between the side plate part 31 and the bottom plate part 32 of the side sill 16.

An installation groove 45 is formed up to the half of the installation plate 38 of the side covering part 37 along the longitudinal direction of the vehicle. A resin clip 46 made independently of the installation plate 38 is attached on the installation groove 45. By engaging this clip 46 in an engagement hole 47 formed in the concavity 34 of the side plate part 31 of the side sill 16, the installation plate part 38 is installed on the side plate part 31 of the side sill 16.

The side sill garnish 15 has a bottom covering part 50 having a plate shape that extends toward the internal direction along the transverse direction of the vehicle from the bottom edge of the side covering part 37, that is, the bottom edge below the bottom plate part 41 of the outside plate part 40. The bottom of the side sill 16 is covered by this bottom covering part 50. Like the upper plate part 39 and the outside plate part 40, this bottom covering part 50 is also formed along the entire length of the side sill garnish 15.

In addition, in the present embodiment, at the inside plate part 42 of the side covering part 37, a bottom installation part 52 made of resin independently of the side sill garnish 15 is installed on a side sill garnish body 53 made of resin by using a installation member 54. This bottom installation part 52 is installed on the bottom plate part 32 of the side sill 16.

The bottom installation part 52 is an integrally formed part that consists of an installation plate part 57 that is fastened to the inside of the inside plate part 42 of the side covering part 37 in the transverse direction of the vehicle; an inward extension plate 58 that extends from the bottom edge of this installation plate 57 substantially horizontally toward the internal direction along the transverse direction of the vehicle; an installation seat part 59 provided on the edge of the inward extension plate 58 inside the vehicle in the transverse direction; ribs 60 that are respectively formed on both edges along the longitudinal direction of the vehicle body of the inward extension plate 58 so as to protrude upwards; and an abutment part 61 that protrudes from the installation plate part 57 toward the external direction along the transverse direction of the vehicle to abut the bottom plate 41 from below. The ribs 60 are formed so as to connect the installation plate part 57 and the installation seat 59. The installation seat 59 has an upward convex form consisting of an installation plate part 62 and a peripheral wall part 63 with form of a case that extends downward from this installation plate part 62.

This bottom installation part 52 abuts the bottom plate part 32 of the side sill outer part 25 from below at the installation part 62 above the installation seat 59. In addition, the clip 65 made of resin independently of the side sill garnish 15 is installed in the installation hole 64 formed in the installation plate part 62 and the engagement hole 66 formed in the bottom plate part 32 of the side sill outer 25. Thus the bottom installation part 52 is installed in the bottom plate part 32 of the side sill 16.

Thereby, the bottom installation part 52 extends from the side covering part 37 toward the bottom plate part 32 of the side sill 16 separately from the bottom covering part 50. In other words, the side sill garnish 15 has a structure that the bottom installation part 52 floats with respect to the bottom covering part 50. Furthermore, the bottom installation part 52 is formed separately from the side sill garnish body 53 and is installed on the side covering part 37. Note that the bottom installation part 52 is installed in the side covering part 37 so as to be positioned above the bottom covering part 50. A notch part 70 for inserting the clip into the bottom installation part 52 is formed in the bottom covering part 50 below the bottom installation part 52.

According to the embodiment described above, the installation plate part 38 of the side covering part 37 is installed on the side plate part 31 of the side sill 16 outside the vehicle in the transverse direction by the clip 46, and at the same time, the bottom installation part 52 is installed on the bottom plate part 32 of the side sill 16 by the clip 65. Furthermore, at this side sill garnish 15, because the bottom installation part 52, separately from the bottom covering part 50, extends from the side covering part 37 toward the bottom plate part 32 of the side sill 16. Therefore, in the case that a force is applied from below to the bottom covering part 50, it is possible to absorb this force by the deformation of only the bottom covering part 50, which is independent of the bottom installation part 52. Therefore, even in the case that a force is applied from below, damage to the side sill garnish 15 occurs with difficulty.

Furthermore, because the bottom installation part 52 is disposed above the bottom covering part 50, even in the case that a force is applied from below at a position where the bottom installation part 52 is present above the bottom covering part 50, damage occurs to the side sill garnish 15 with difficulty. That is, when the bottom installation part 52 and the bottom covering part 50 have the identical heights, if a notch is formed in the bottom covering part 50 that allows the bottom installation part 52 to pass through vertically, in the case that a force is applied from below at a position offset from the notch, damage can be prevented. However, in the case that a force is applied from below at the position aligned with the notch part of the bottom covering part 50, damage to the bottom installation part 52 that applied the force directly may occur. In contrast, at the side sill garnish 15, such damage is also prevented because the bottom installation part 52 is disposed above the bottom covering part 50.

In addition, because the bottom installation part 52 installed on the side covering part 37 is formed as a separate body, even if the force from below is large and damage occurs to the bottom installation part 52, only the bottom installation part 52 needs to be replaced. That is, because the bottom installation part 52 is provided separately, damage to the side sill garnish body 53 can be avoided, and thus it can be reused. Therefore, it is possible to keep the replacement cost down even in the unfortunate case that damage occurs. Note that it is possible to form a fragile form such as a groove or neck in the bottom installation part 52 so that the bottom installation part 52 will more reliably be damaged before the bottom covering part 50.

Here, among the installation locations of the side sill 16 and the side sill garnish 15, except for the installation locations the farthest back along the longitudinal direction of the vehicle, like the conventional technology, two or more installation plate parts 31 provided on the side covering part 37 that cover the side part of the side sill 16 are respectively installed on the side plate part 31 of the side sill 16 by the clip 46, and at the same time, two or more bottom installation parts (not illustrated) provided on the bottom covering part 50 that extends from the bottom end of the side covering part 37 toward the internal direction along the transverse direction of the vehicle are respectively installed on the bottom plate part 32 of the side sill 16 by the clips so as to cover the bottom of the side sill 16.

While preferred embodiments of the invention have been described above and illustrated, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An installation structure for a side sill garnish installed on a side sill, wherein the side sill garnish comprises:
   a side covering part that covers a side part of the side sill outside the vehicle in the transverse direction;
   a side installation part that is installed on the side part of the side sill;
   a bottom covering part that extends from the bottom edge of the side covering part toward the internal direction along the transverse direction of the vehicle and covers the bottom of the side sill;
   a bottom installation part that is installed on the bottom of the side sill that extends from the side covering part toward the bottom of the side sill, and that is disposed above and separately from the bottom covering part; and
   a notch part formed in the bottom covering part below the bottom installation part, the notch part allowing a fixing element to pass through the bottom covering part and into the bottom installation part.

2. An installation structure for a side sill garnish according to claim 1, wherein the bottom installation part is formed separately from the side covering part, and is installed on the side covering part.

\* \* \* \* \*